United States Patent [19]

Brückl et al.

[11] 4,453,293

[45] Jun. 12, 1984

[54] CLAMPING ARRANGEMENT FOR CORONA DISCHARGE WIRE

[75] Inventors: Konrad Brückl; Georg Fryda, both of Munich, Fed. Rep. of Germany

[73] Assignee: Agfa-Gevaert AG, Leverkusen, Fed. Rep. of Germany

[21] Appl. No.: 312,634

[22] Filed: Oct. 19, 1981

[30] Foreign Application Priority Data

Oct. 22, 1980 [DE] Fed. Rep. of Germany ....... 3039752

[51] Int. Cl.³ .............................................. F16G 11/00

[52] U.S. Cl. ................................ 24/131 C; 24/136 R; 256/39

[58] Field of Search ................ 24/136 R, 71.2, 131 C, 24/136 R; 256/39, 40, DIG. 1, DIG. 3; 339/103 B, 252 R, 253 S, 253 R

[56] References Cited

U.S. PATENT DOCUMENTS

| | | | |
|---|---|---|---|
| 502,515 | 8/1893 | Greene | 256/39 |
| 4,214,733 | 7/1980 | Brückl et al. | 24/131 C |
| 4,328,605 | 5/1982 | Hutchison et al. | 24/136 R |

FOREIGN PATENT DOCUMENTS 2825104 12/1979 Fed. Rep. of Germany .

*Primary Examiner*—Gene Mancene
*Assistant Examiner*—James Hakomaki
*Attorney, Agent, or Firm*—Michael J. Striker

[57] ABSTRACT

A clamping arrangement for clamping a corona discharge wire in electrophotographic copying apparatuses has a bush member with an inner surface provided with a plurality of teeth, a clamping member located inside the bush and having an outer surface provided with a plurality of teeth, so that one end portion of the corona discharge wire can be clamped between the teeth of the bush and the clamping member, a sliding member displaceable in a longitudinal direction of the corona discharge wire so as to support at least the clamping member therein, and a spring member engaging the sliding member and acting in a direction which is opposite to the pulling direction of the corona discharge wire.

8 Claims, 3 Drawing Figures

CLAMPING ARRANGEMENT FOR CORONA DISCHARGE WIRE

BACKGROUND OF THE INVENTION

The present invention relates to a clamping arrangement for corona discharge wires in electrophotographic copying apparatuses.

Clamping arrangements of the general type mentioned above are known in the art. In a known clamping arrangement, at least one end portion of a corona discharge wire is clamped between a toothed outer surface of a rotatable clamping member and a toothed inner surface of a bush receiving the clamping member. At at least one end portion of the wire, electrical connection means is provided for connecting the wire to a current supply. Such a clamping arrangement is disclosed, for example, in German Offenlegungsschrift No. 2,825,104. The known arrangement possesses the disadvantage that it does not guarantee long-lasting vibration-free clamping of the wire.

SUMMARY OF THE INVENTION

Accordingly, it is an object of the present invention to provide a clamping arrangement which avoids the disadvantages of the prior art.

More particularly, it is an object of the present invention to provide a clamping arrangement in which a corona discharge wire is clamped with approximately identically maintained tension and in a vibration-free manner.

In keeping with these objects, and with others which will become apparent hereinafter, one feature of the present invention resides, briefly stated, in a clamping arrangement in which a clamping member for the wire end portion not connected with a current source is accommodated in a sliding member which is displaceable in longitudinal direction of the clamped wire, and a spring is provided which engages the sliding member and acts in direction opposite to a pulling direction of the wire.

When the clamping arrangement is designed in accordance with the present invention, overtightening of the wire both by overturning of the clamping member during the mounting, and also during the operation because of heat expansion is reliably prevented. The friction which takes place between the sliding member and its guide during movement of the sliding member accommodating the clamping member leads to absorption of vibrations satisfactory for all practical cases.

In accordance with another feature of the present invention, a U-shaped housing is provided and accommodates a bearing body with guides for the sliding member.

Still another feature of the present invention resides in the fact that the spring is formed as a pressure spring and arranged between the sliding member and the bearing body.

A further feature of the present invention resides in the fact that the bearing body is connected with the U-shaped housing by a pin which engages in a longitudinal slot formed in the housing above the axis line of the wire and opening in a direction opposite to the pulling direction of the wire.

Finally, in accordance with still a further feature of the present invention, the guide for the sliding member embraces the clamping member accommodated in the latter so as to retain the clamping member in its bush.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
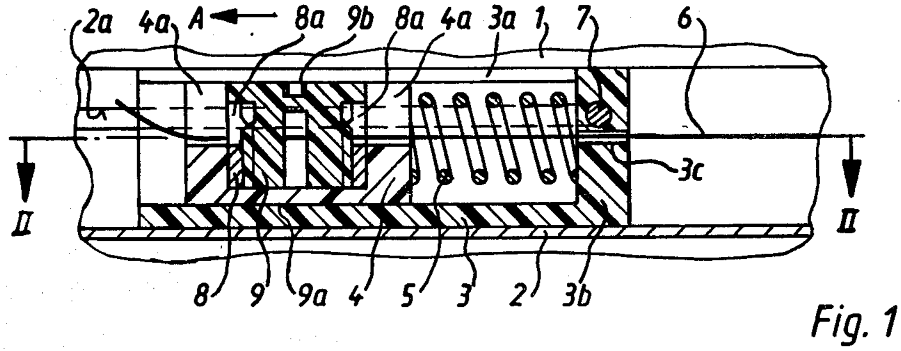
FIG. 1 is a view showing a section of a clamping arrangement in accordance with the present invention.
Figure 2:
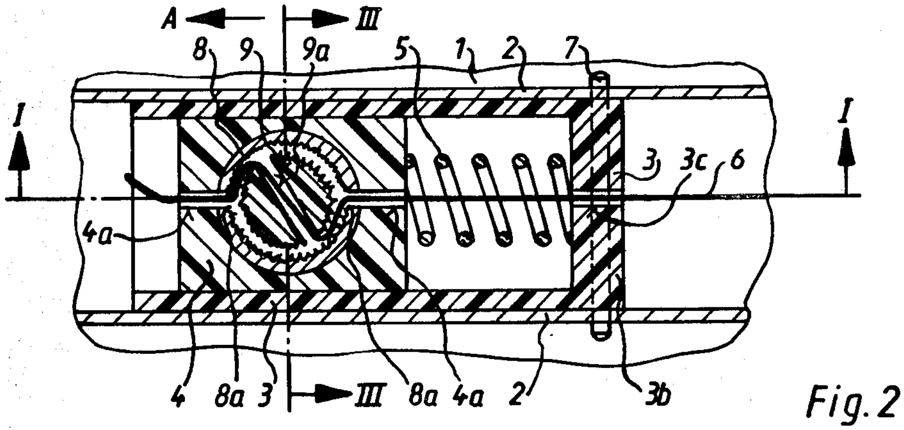
FIG. 2 is a view showing a section taken along the line 2—2 in FIG. 1.
Figure 3:
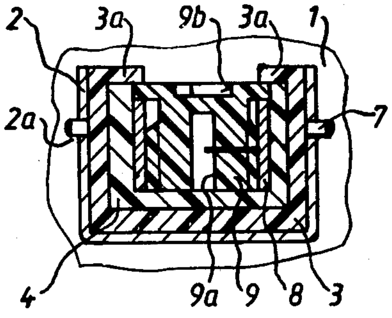
FIG. 3 is a view showing a section taken along the line 3—3 in FIG. 2.

As can be seen from the drawing, an apparatus frame is U-shaped and identified by reference numeral 1. A corona housing 2 composed of metal is arranged inside the U-shaped housing 1 in a known manner.

A bearing body 3 is inserted in the corona housing 2 and composed of an electrically insulating synthetic plastic material, for example polycarbonate which is known under the tradename Macralon. A sliding member 4 which is also composed of electrically insulating synthetic plastic material is accommodated in the bearing body 3. The sliding member 4 is retained in the bearing body 3 by guiding projections *3a* and *3b* which are molded on the bearing body 3.

A spring 5 is provided between a wall *3b* of the bearing body 3 and the sliding member 4. The spring 5 is a pressure spring and applies to the sliding member 4 a force which acts in direction identified by the arrow A to thereby clamp a corona discharge wire 6.

For mounting the bearing body 3 in the corona housing 2, a fixing pin 7 is provided. The fixing pin 7 is inserted through the bearing body 3 and engages by its two ends the sides of the bearing body in a longitudinal slot *2a* opening opposite to the pulling direction of the spring 5. The longitudinal slot *2a* is arranged above the cental axis of the clamped wire 6, whereby vertical tilting of the bearing body under the action of the wire is reliably prevented.

A bush 8, which is advantageously composed of metal, is mounted in the sliding member 4. The bush 8 is provided with inner teeth. The clamping member 9 is provided with outer teeth and located inside the bush 8. Both the clamping member 9 and the bush 8 and the sliding member 4 are provided with throughgoing openings *9a*, *8a* and *4a* for the corona discharge wire 6 extending through a throughgoing opening *3c* of the bearing body 3. The slot *9a*, which extends over the major part of the length of the clamping member 9 subdivides the portion of the clamping member 9 carrying the teeth into two halves which are springy relative to one another. As a result of this, the outer teeth of this part can spring relative to the inner teeth of the bush 8.

The clamping member 9 is also provided at its outer surface with a slot *9b*. A tightening tool, such as for example a screwdriver, can be inserted into the slot *9b* for actuation of the clamping member 9.

When after the insertion of the bearing body 3 into the corona housing 2 the throughgoing openings *3c*, *4a*, 8*a* and 9*a* are brought into coincidence by respective rotation of the clamping member 9 and the end portion of the corona discharge wire 6 clamped in the corona housing extends through these openings, the corona discharge wire 6 is engaged by the teeth of the clamping member 9, as disclosed in the above-mentioned German Offenlegungsschrift No. 2,825,104 to be coiled around the clamping member 9 and thereby clamped. When the sliding member 4 is inserted in the bearing body 3, the clamping member 9 in the sliding member is retained in its bush 8 by the guides 3*a* overlapping the clamping member. Return turning of the clamping member 9 under the action of the pulling of the wire or unclamping of the corona discharge wire 6 is prevented by the inner teeth of the bush 8, in which the teeth of the clamping member 9 engage. During tightening of the wire 9, the pressure spring 5 is compressed, whereby overexpansion of the wire within certain limits is prevented, on the one hand, and length changes of the wire due to temperature variations and the like are compensated, on the other hand. Friction between the surfaces of synthetic plastic material during the movement of the sliding member 4 in the bearing body 3 acts in vibration-absorbing manner. Thereby, despite the fact that the spring 8 is arranged for force transmission between the clamping arrangement and the wire to be clamped, it cannot lead to great longitudinal vibrations of the wire 6.

It will be understood that each of the elements described above, or two or more together, may also find a useful application in other types of constructions differing from the types described above.

While the invention has been illustrated and described as embodied in a clamping arrangement for a corona discharge wire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clamping arrangement for clamping a corona discharge wire in electrophotographic copying apparatuses, wherein the wire has two end portions of which one end portion is connected with a current supply and the other end portion is not connected therewith, the clamping arrangement comprising clamping means which includes a bush member having an inner surface provided with a plurality of teeth and a clamping member located inside such bush member and having an outer surface provided with a plurality of teeth, so that the other end portion of the corona discharge wire, which is not connected with the current supply, can be clamped between the teeth of said bush member and the teeth of said clamping member upon rotation of said clamping member and solely by interaction of said clamping member and said bush member; a sliding member displaceable in a direction corresponding to a direction of elongation of the corona discharge wire in clamped condition and arranged to surround and support at least said clamping member of said clamping means so as to perform supporting functions without performing clamping functions; a spring member engaging said sliding member and acting in a direction which is opposite to a pulling direction of the corona discharge wire; and means for guiding said sliding member during its displacement in the direction corresponding to the direction of elongation of the corona discharge wire in clamped condition and including a stationary elongated U-shaped housing and an elongated bearing body inserted in said housing and having guides for guiding said sliding member with friction operative for absorbing vibrations.

2. A clamping arrangement as defined in claim 1, wherein said bearing body is also stationary and U-shaped and has three relatively long inner surfaces along which said sliding member slides with friction.

3. A clamping arrangement as defined in claim 1, wherein said spring is a pressure spring and is arranged between said bearing body and said sliding member.

4. A clamping arrangement as defined in claim 1; and further comprising means for connecting said bearing body with said U-shaped housing and including a fixing pin.

5. A clamping arrangement as defined in claim 4, wherein said housing has a bottom, a location corresponding to an axis of the corona discharge wire, and a longitudinal slot which is located above said location corresponding to the axis of the corona discharge wire and opens in a direction opposite to a direction of pulling of the corona discharge wire, said fixing pin engaging in said longitudinal slot.

6. A clamping arrangement as defined in claim 1, wherein said guides for guiding said sliding members embrace said clamping member received in said sliding member so as to retain said clamping member in said bush member.

7. A clamping arrangement as defined in claim 6, wherein said guides for guiding said sliding member overlap at least a portion of said clamping member to retain the latter in said bush member.

8. A clamping arrangement as defined in claim 1, wherein said sliding member and said spring member are arranged so that during clamping of the corona discharge wire said spring member is compressed so as to prevent overexpansion of the corona discharge wire and to compensate its length changes caused by temperature variations.

* * * * *